US005581295A

United States Patent [19]
Prowak

[11] Patent Number: 5,581,295
[45] Date of Patent: Dec. 3, 1996

[54] METHOD AND APPARATUS FOR RESEQUENCING IMAGE DATA FOR A PRINTHEAD

[75] Inventor: James R. Prowak, Rochester, N.Y.

[73] Assignee: Eastman Kodak Company, Rochester, N.Y.

[21] Appl. No.: 982,547

[22] Filed: Nov. 27, 1992

[51] Int. Cl.[6] .............................. B41J 2/435; B41J 2/45; H04N 1/40; H04N 1/21

[52] U.S. Cl. ........................ 347/237; 347/240; 358/460; 358/298; 395/116

[58] Field of Search ................................ 346/107 R, 1.1; 358/298, 302, 448, 460; 395/108, 115, 116; 347/240, 183, 131, 15, 900, 237, 132

[56] References Cited

U.S. PATENT DOCUMENTS

| 4,071,849 | 1/1978 | Koyano et al. ....................... 358/298 X |
| 4,074,319 | 2/1978 | Goldschmidt et al. .............. 358/302 X |
| 4,368,491 | 1/1983 | Saito ..................................... 358/298 X |
| 4,746,941 | 5/1988 | Pham et al. . |
| 4,882,686 | 11/1989 | Gretter . |
| 5,126,759 | 6/1992 | Small et al. . |

FOREIGN PATENT DOCUMENTS

WO89/07753  12/1989  WIPO .
WO90/10311  1/1990  WIPO .

OTHER PUBLICATIONS

J. P. Montey and L. E. Rittenhouse, *IBM Technical Disclosure Bulletin*, "Cascadeable Linear LED Array Module", vol. 24, No. 10, Mar. 1982.

*Primary Examiner*—Benjamin R. Fuller
*Assistant Examiner*—David Yockey
*Attorney, Agent, or Firm*—Norman Rushefsky

[57] ABSTRACT

A method and apparatus for resequencing image data for a non-impact printer having a plurality of recording elements. A memory stores image data such that image data for plural recording elements are stored at one address location. The memory is sequentially addressed so that the data stored at successive addresses are sequentially output from the memory in a sequence suited for the type of printhead. A multiplexer controls the outputs from the memory so that only data in the correct sequence is output at each address location during a first empty cycle whereas other image data at each address location are output at subsequent empty cycles.

9 Claims, 7 Drawing Sheets

FIG. 4B

METHOD AND APPARATUS FOR RESEQUENCING IMAGE DATA FOR A PRINTHEAD

CROSS-REFERENCE TO RELATED APPLICATIONS

This application is related to the following U.S. applications filed on even date herewith: 1. U.S. application Ser. No. 07/982,365, now U.S. Pat. No. 5,367,383 filed in the name of Russell L. Godshalk and entitled "Method and Apparatus for Maximizing Data Storage In A Processor of Image Data; 2. U.S. application Ser. No. 07/982,546, now U.S. Pat. No. 5,384,646 filed in the names of Russell L. Godshalk et al and entitled "Marking Engine For Grey Level Printing Having a High Productivity Image Data Processing Mode".

1. Field of the Invention

The present invention relates to apparatus and methods for resequencing of image data to a non-impact printhead.

2. Description Relative to the Prior Art

In the prior art, printing apparatus is described which comprises a multiplicity of individually addressable and energizable point-like radiation sources, such as light-emitting diodes (LEDs), arranged in row(s) for exposing points upon a photoreceptor during movement thereof relative to and in a direction normal to the row(s). For example, driver circuits may be provided for simultaneously energizing the radiation sources responsive to respective data bit input signals applied to the driver circuits during an information line period. The print or recording head includes a support upon which are mounted chips placed end to end and upon each of which are located a group of LEDs. The driver circuits are incorporated in other integrated circuit chips located to each side of the linear array of LEDs. The driver chips are provided to both sides of the LED array and the drive circuitry is alternately interleaved. The linear array with respective driver circuits thereby collectively forms an LED bar. The print or recording head is typically a multi-channel device; e.g., the data is supplied to the several driver circuits in the print head on multiple data lines or channels. The number of such channels is typically two or four, and sometimes higher numbers depending upon the print head configuration.

In U.S. Pat. No. 4,746,941, the contents of which are incorporated herein by this reference, a grey scale LED printhead is described wherein plural data bits are used to determine each pixel recording period. The driver circuits in such apparatus each include a data bus for conveying successive 6-bit signals and for driving respective LEDs in accordance with the data or image signals. Latch registers on the driver chips latch the data in response to a token bit. Because of the extremely small separation distance between the individual LEDs, the conductive lines to each LED are arranged at the periphery of the LED group in an odd-even pattern. At one side of a LED bar is arranged the conductive lines or foils which lead to the shift registers for the even-numbered LEDs, and at the opposing side are the lines similarly arranged to the registers for the odd-numbered LEDs. Hence, data is advantageously provided simultaneously to the odd and even driver chips located to either side of the LEDs. The data for the lowest numbered odd and even pair of LEDs are provided first and the data for the highest numbered odd and even LEDs are provided last, (i.e. (1,2), (3,4) . . . .

In PCT publication WO 90/07753, there is described a resequencing line store device for reformatting data from a raster image processor (RIP) to a binary operated printhead. As noted in the publication, the driver chips on this printhead are connected together to form four serial data shift register sets for storing that data respectively for high odd-numbered LEDs, high even-numbered LEDs, low odd-numbered LEDs and low even-numbered LEDs. In this printhead only one data bit is required to determine if an LED is to be enabled to record a pixel. In this printhead and assuming 5000 LEDs are provided in a row on the printhead, data for the sets of shift registers would be provided for the LED numbers as follows: (2500, 2499, 5000, 4999), (2498, 2497, 4998, 4997), . . . (2,1, 2502, 2501).

Thus, the order of data output to the printhead by the sequencing line store is not suited to a grey level printhead of the type described in the aforementioned U.S. patent.

It is an objective therefore to provide a printer apparatus having data reformatting which is suited for a grey level or other printhead designed or configured into sets wherein the data for the sets is to be loaded lowest numbered recording elements first and highest numbered recording elements last.

SUMMARY OF THE INVENTION

This and other objects of the invention which will become apparent after description of the preferred embodiments are realized by a method and apparatus for resequencing image data for a non-impact printhead, the non-impact printhead having plural recording elements, the recording elements being arranged on said printhead in a sequential order with certain recording elements being considered in a first group and other recording elements being considered in a second group, the method comprising storing at a predetermined address location in a first memory plural bits of image data corresponding to respective recording elements in both groupings; and sequentially addressing addresses to said first memory in a predetermined order and outputting from said first memory a series of data bits in a direct sequence starting with data bits corresponding to recording elements in one group without simultaneously outputting from said first memory data bits corresponding to recording elements in the other group.

DESCRIPTION OF THE PREFERRED EMBODIMENT

The apparatus of the preferred embodiment will be described in accordance with an electrostatographic recording medium. The invention, however, is not limited to apparatus for creating images on such a medium, as other media such as photographic film etc. may also be used within the spirit of the invention.

Because electrostatographic reproduction apparatus are well known, the present description will be directed in particular to elements forming part of or cooperating more directly with the present invention. Apparatus not specifically shown or described herein are selectable from those known in the prior art.

Figure 1:
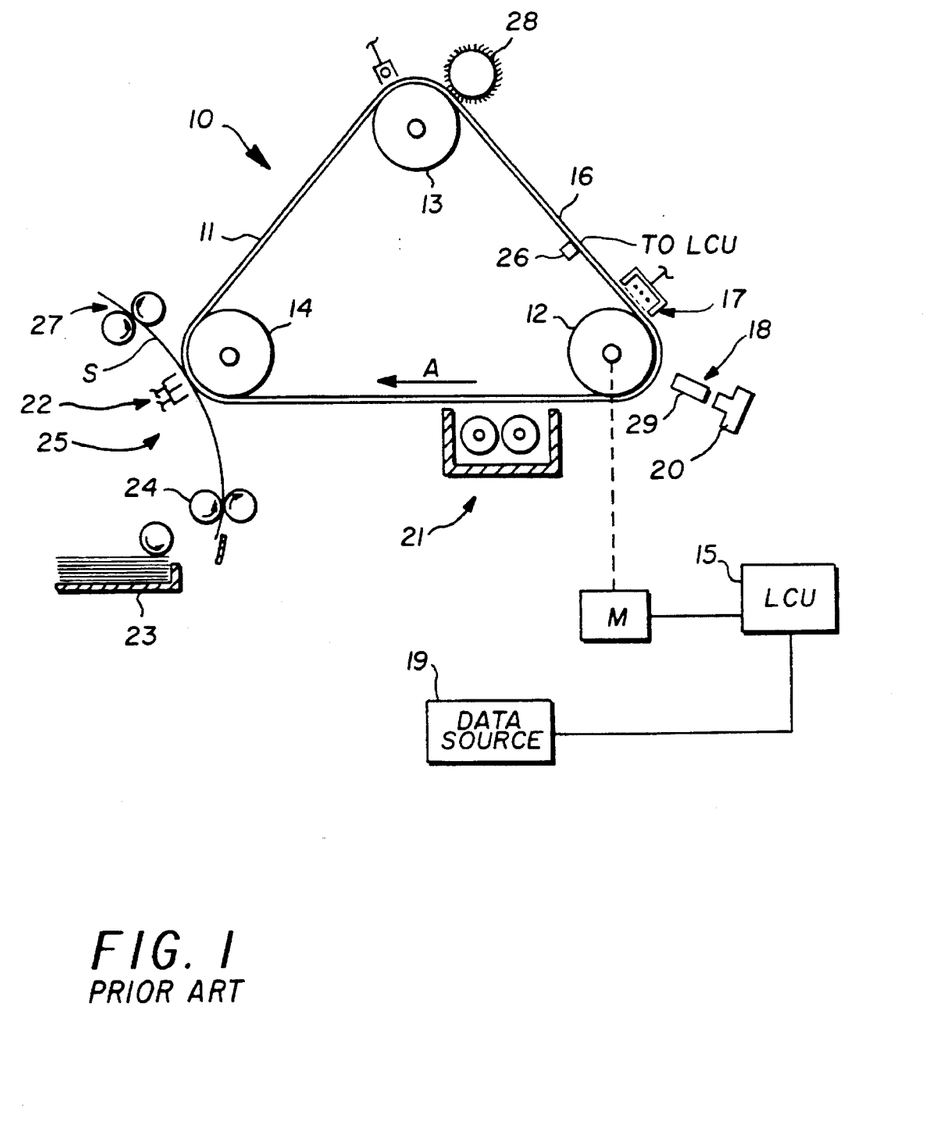
FIG. 1 is a schematic of a printing apparatus of the prior art.

With reference now to FIG. 1, an electrostatographic reproduction apparatus 10 includes a recording medium such as a photoconductive web 11 or other photosensitive medium that is trained about three transport rollers 12, 13 and 14, thereby forming an endless or continuous web. Roller 12 is coupled to a driver motor M in a conventional manner. Motor M is connected to a source of potential when a switch (not shown) is closed by a signal from a logic and control unit (LCU) 15. When the switch is closed, the roller 12 is driven by the motor M and moves the web 11 in clockwise direction as indicated by arrow A. This movement causes successive image areas of web 11 to sequentially pass a series of electrophotographic work stations of the reproduction apparatus.

For the purposes of the instant disclosure, several work stations are shown along the web's path. These stations will be briefly described.

First, a charging station 17 is provided at which the photoconductive surface 16 of the web 11 is sensitized by applying to such surface a uniform electrostatic primary charge of a predetermined voltage. The output of the charger may be controlled by a grid connected to a programmable power supply (not shown). The supply is in turn controlled by the LCU 15 to adjust the voltage level Vo applied onto the surface 16 by the charger 17.

At an exposure station 18 an electrostatic image is formed by modulating the primary charge on an image area of the surface 16 with selective energization of point-like radiation sources in accordance with signals provided by an image data source 19 such as a document image scanner, computer work station, word processor, and the like. The print jobs may be queued in a print server, and spooled one page at a time to a raster image processor (RIP). The point-like radiation sources are supported in a print head 20 to be described in more detail below.

A development station 21 includes developer which may consist of iron carrier particles and electroscopic toner particles with an electrostatic charge suited for developing the latent electrostatic image, as is well known. Developer is brushed over the photoconductive surface 16 of the web 11 and toner particles adhere to the latent electrostatic image to form a visible toner particle, transferable image. The development station may be of the magnetic brush type with one or two rollers.

The apparatus 10 also includes a transfer station 25 shown with a corona charger 22 at which the toner image on web 11 is transferred to a copy sheet S; and a cleaning station 28, at which the photoconductive surface 16 of the web 11 is cleaned of any residual toner particles remaining after the toner images have been transferred. After the transfer of the unfixed toner images to a copy sheet S, such sheet is transported to a heated pressure roller fuser 27 where the image is fixed to the copy sheet S.

As shown in FIG. 1, a copy sheet S is fed from a supply 23 to driver rollers 24, which then urge the sheet to move forward onto the web 11 in alignment with a toner image at the transfer station 25.

To coordinate operation of the various work stations 17, 18, 21, and 25 with movement of the image areas on the web 11 past these stations, the web has a plurality of indicia such as perforations along one of its edges. These perforations generally are spaced equidistantly along the edge of the web 11. At a fixed location along the path of web movement, there is provided suitable means 26 for sensing web perforations. This sensing produces input signals into the workstation LCU 15 which has a digital computer, preferably a microprocessor. The microprocessor has a stored program responsive to the input signals for sequentially actuating, then de-actuating the work stations as well as for controlling the operation of many other machine functions. Additional or other encoding means may be provided as known in the art for providing the precise timing signals for control of the various functions of the apparatus 10.

Programming of a number of commercially available microprocessors is a conventional skill well understood in the art. This disclosure is written to enable a programmer having ordinary skill in the art to produce an appropriate control program for the one or more microprocessors used in this apparatus. The particular details of any such program would, of course, depend on the architecture of the designated microprocessor.

Figure 2:
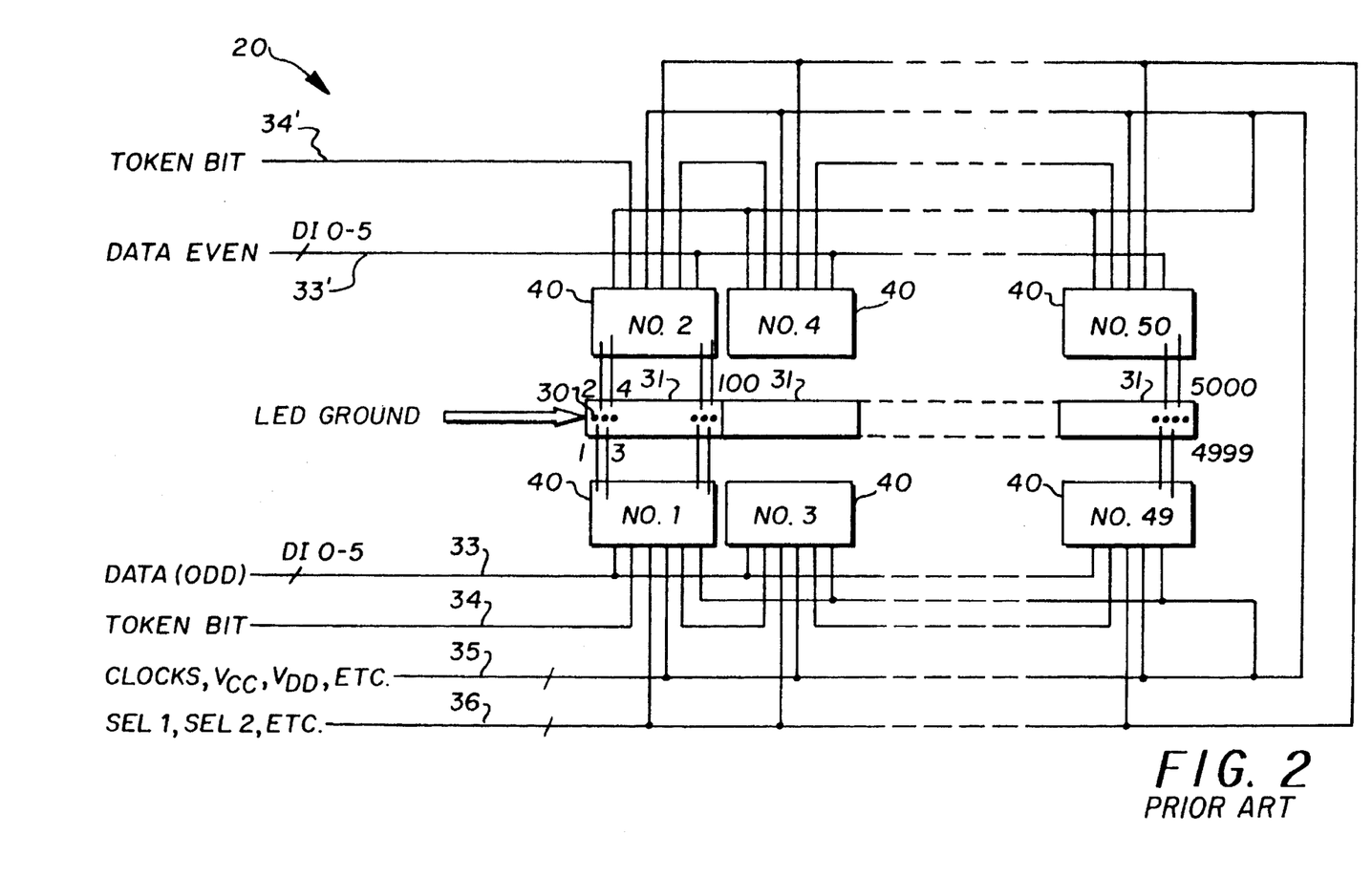
FIG. 2 is a block diagram of circuitry used in forming a print head of the apparatus of FIG. 1 in accordance with the prior art.

With reference to FIGS. 1 and 2, the print head 20, as noted, is provided with a multiplicity of energizable point-like radiation sources 30, preferably light-emitting diodes (LEDs) arranged in a row although other recording devices such as thermal devices, liquid crystal display elements or needle electrodes are also contemplated. Optical means 29 may be provided for focusing light from each of the LEDs onto the photoconductive surface. The optical means preferably comprises an array of optical fibers such as sold under the name SELFOC, a trademark for a gradient index lens array sold by Nippon Sheet Glass, Limited. Due to the focusing power of the optical means 29, a row of emitters will be imaged on a respective transverse line on the recording medium.

With reference to FIG. 2, the print head 20 comprises a suitable support with a series of LED chips 31 mounted thereon. Assume for purposes of facilitating discussion that each of the chips 31 includes in this example 100 LEDs arranged in a single row. Chips 31 are also arranged end-to-end in a row and where fifty LED chips are so arranged, the print head will extend across the width of the web 11 and include 5000 LEDs arranged in a single row. To each side of this row of LEDs there are provided in this example fifty identical driver chips 40. Each of these driver chips include circuitry for addressing the logic associated with each of 50 LEDs to control whether or not an LED should be energized or activated. Two driver chips 40 are thus associated with each chip of 100 LEDs. Each of the two driver chips will be coupled for driving of alternate LEDs. Thus, one driver chip will drive the odd numbered LEDs of the 100 LEDs and the other will drive the even numbered LEDs of these 100 LEDs. The driver chips 40 are electrically connected in parallel to a plurality of lines 33–36 providing various electrical control signals and potentials. A plurality of lines designated 35 provide electrical energy and ground for operating the various logic devices and current drivers in accordance with their voltage requirements and also provide clock signals and other pulses for controlling the movement of data to the LEDs in accordance with known techniques. A data bus 33 comprising data is provided for providing a 6-bit digital data or image signal. The 6-bit data signal represents an exposure duration for recording a single grey level pixel during a pixel recording period as will be further described below. The driver chips each include a connection to this data bus to provide access to the data on this bus. A token bit signal on line 34 identifies a register within a particular driver chip that is associated with a particular LED to which the data pertains. In response to this token bit signal, this register latches the 6-bit data signal currently on the data line 33. Data on data bus lines 33 are provided in time sequential order so that data for LED #1 comes first, then data for LED #3 and so on for each of the odd-numbered LEDs up to data for LED #4999. Simultaneously, there is provided on data bus lines 33' data in sequential order for the even-numbered LEDs and latched in appropriate registers for these LEDs by a token bit signal on line 34'. Further details describing the driver chips is provided in the aforementioned incorporated by reference U.S. Pat. No. 4,746,941. Additional lines 36 such as providing various selection choices are further described in U.S. Pat. No. 5,126,759, the pertinent contents of which are also incorporated herein by this reference and in particular descriptive subject matter relative to architecture of a driver chip for receiving data and driving an LED with a multibit digital signal.

Figures 3, 3A:
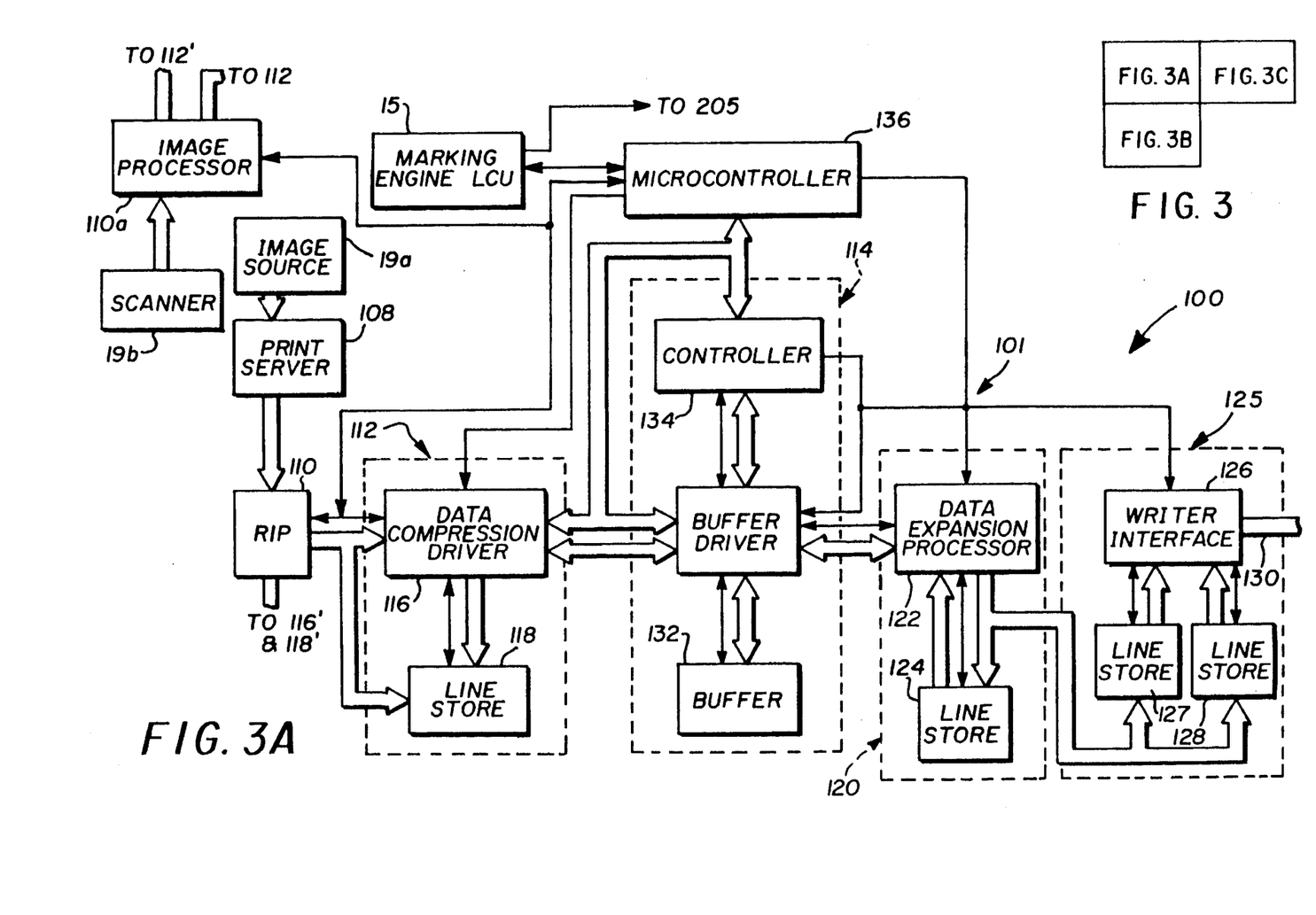
FIGS. 3, 3A, B and C represent a block diagram of a printer control system which includes an improved data resequencing circuit for formatting data to the driver circuitry of the print head of FIG. 2 in accordance with the invention.
Figure 3B:
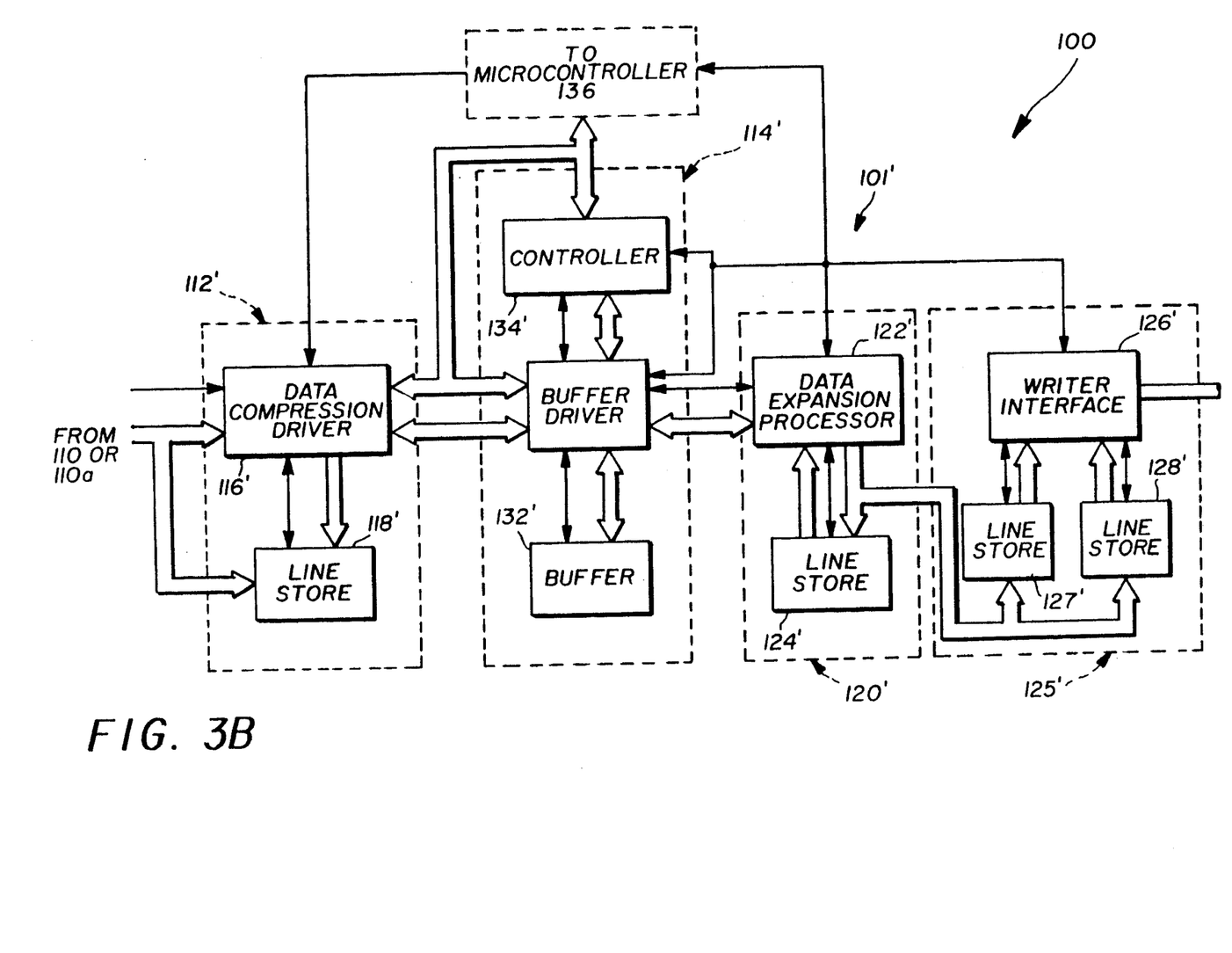

With reference now to FIGS. 3, 3A and 3B, a printer control system 100 is shown. The printer control system 100 is operable in conjunction with or disposed within the LCU 15 of the reproduction apparatus 10 as described previously with respect to FIG. 1. The printer control system 100 is therefore interconnected with the image source 19 and the print head 20. General motor control and control of other workstation functions as previously described with respect to the LCU 15 are thus unchanged.

In FIG. 3A, elements comprising a job image buffer of JIB 101 are interconnected by a series of data links shown as double-line arrows and control links shown as single-line arrows. Image data source 19 produces print jobs as either character code signals pictorial signals or scanned data signals from a document to be copies to be queued in a print server 108, and spooled one page at a time to a raster image processor (RIP) 110. The RIP converts the code signals input thereof to a rasterized video data stream for printing pixel by pixel as described hereinabove. The data output from the RIP is a 2-bit digital signal representing a grey level for each pixel to be recorded. When output from the RIP, the 2-bit signal for each pixel is split with the lower significant bit being processed by JIB 101 and the higher significant bit being processed by JIB 101'. As the two JIBs are substantially similar, description will now be made of JIB 100, it being understood that such description will also apply to JIB 101' whose similar elements are also indicated with a prime (').

The JIB 101 receives the image data stream from the RIP 110. The JIB 101 includes a data compressor 112, which is preferably a hardware implementation of an appropriate algorithm which encodes redundant information into a more compact form before passing the compressed data stream to a multi-page image buffer 114, also part of the JIB. Data compression algorithms are well known to those skilled in the art. Data compressor 112 includes a data stream compression driver 116 and a line store 118 for buffering a full line's worth of data of least significant bits.

An expander 120 is the companion to data compressor 112, and it includes a data expansion processor 122 and a line store 124. The expander retrieves the compressed data stream from multi-page image buffer 114 and reconstructs the output data into approximately original form as input to the data compressor 112. The data stream is transmitted to a data resequencing circuit 125 as sixteen-bit data words on a parallel data link. The resequencing circuit 125 is comprised of two resequencing line store devices 127 and 128 constructed according to the invention described in International application PCT WO 90/07753, the contents of which are incorporated herein, and a writer interface 126, and is also part of the JIB.

Multi-page image buffer 114 is provided for storing image data to permit the electronic recirculation of images for collation; thereby eliminating the need for a mechanical recirculating document handler. The heart of the JIB is a large bank of dynamic random access memory (DRAM) in a buffer 132 for storage of the image data as it is processed by data compressor 112. Alternatively, a disk may comprise the memory in buffer 132 or other mass storage devices may be used.

Controller 134 acts as a direct memory access controller, allowing data compressor 112 and expander 120 direct access to DRAM buffer 132 without a microprocessor, and as a DRAM controller arbitrating between memory read, write, and refresh cycles.

A microcontroller 136 functions as the system manager, overseeing the overall operation of the JIBS 101, 101'. The microcontroller will handle communication with the microprocessor of the logic and control unit (LCU) 15 of the marking engine, store the internal pointers identifying, for example, the beginning and ending addresses for each image, initiate transfers from the RIP 110, and control the data compression and expansion process.

The writer interface 126 receives a full line of image data from the expander 120 after the line is processed by one of the pair of resequencing line stores 127 and 128. The resequencing line stores 127 and 128 are duplicate devices, each of which are operable for the resequencing of data.

It should be understood that the second of the two duplicate devices is also provided for operating upon a second line of data. Thus, in any two lines of data wherein the first line is presented by the expander 120 before the second line, the second line of data is being resequenced by one of the two resequencing line store devices 127 and 128 while the first line of data, already resequenced, is being output by the writer interface 126 to the additional or further resequencer of FIG. 3c. Accordingly, when a third line of data is then presented to the latter line store, the former line store is then delivering the resequenced second line from the writer interface 126 to the additional or further resequencer of FIG. 3c.

In accordance with the invention, there are in this example 5000×2 bits of data or image signals to be resequenced for each line of rasterized image data. The 5000 lower significant bits of image data per data line exit the JIB 101 in groups of odd/low, odd/high, even/low, even/high ordered bits to a buffer 202 that forms a part of a further resequencer 130. The reason for this is due to the fact that the further resequencer serves as a sequence modifier which modifies data otherwise sequenced for a printer system similar to that described in International Application PCT 90/07753.

Figure 3C:
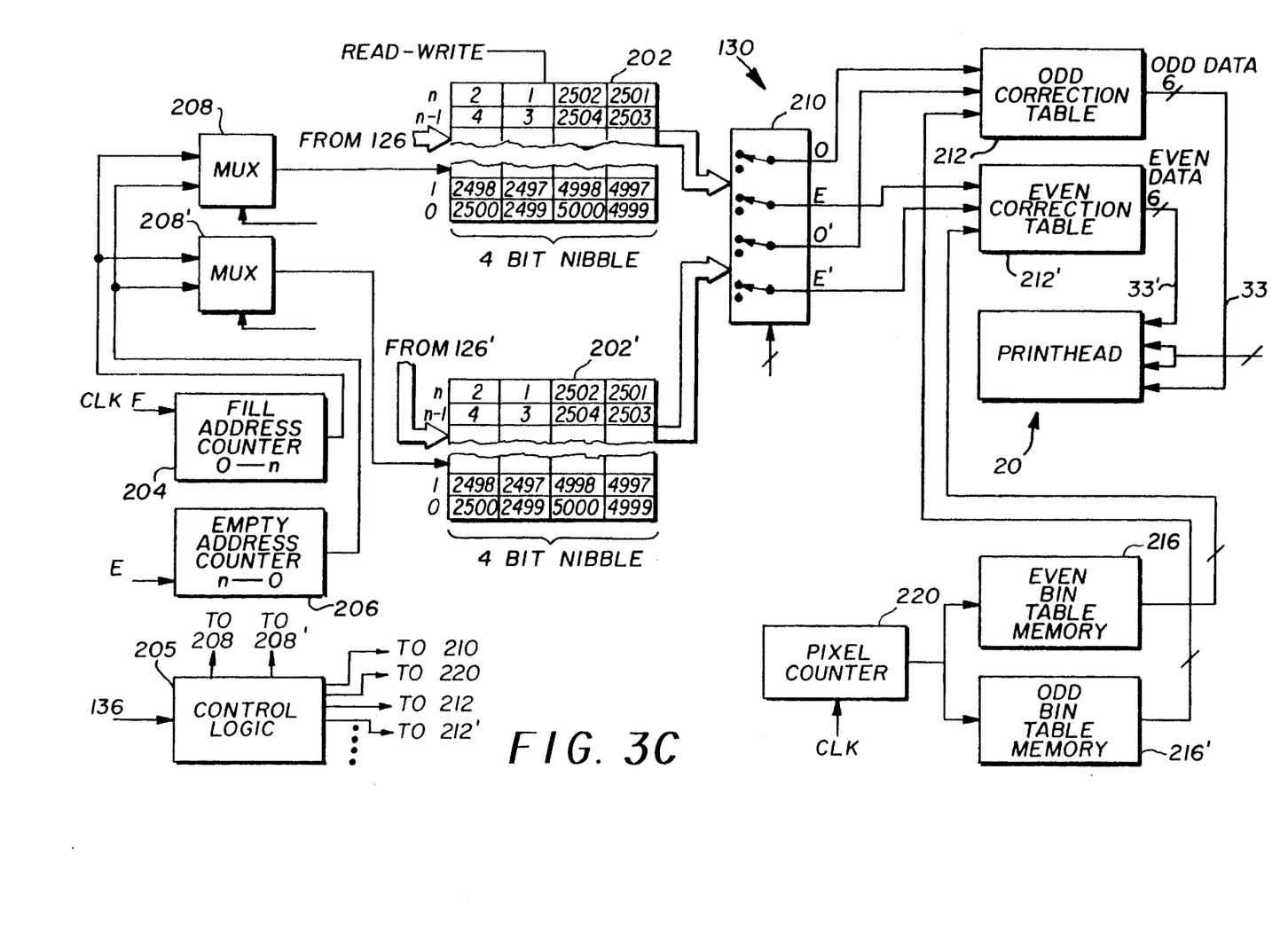
Figure 4A:
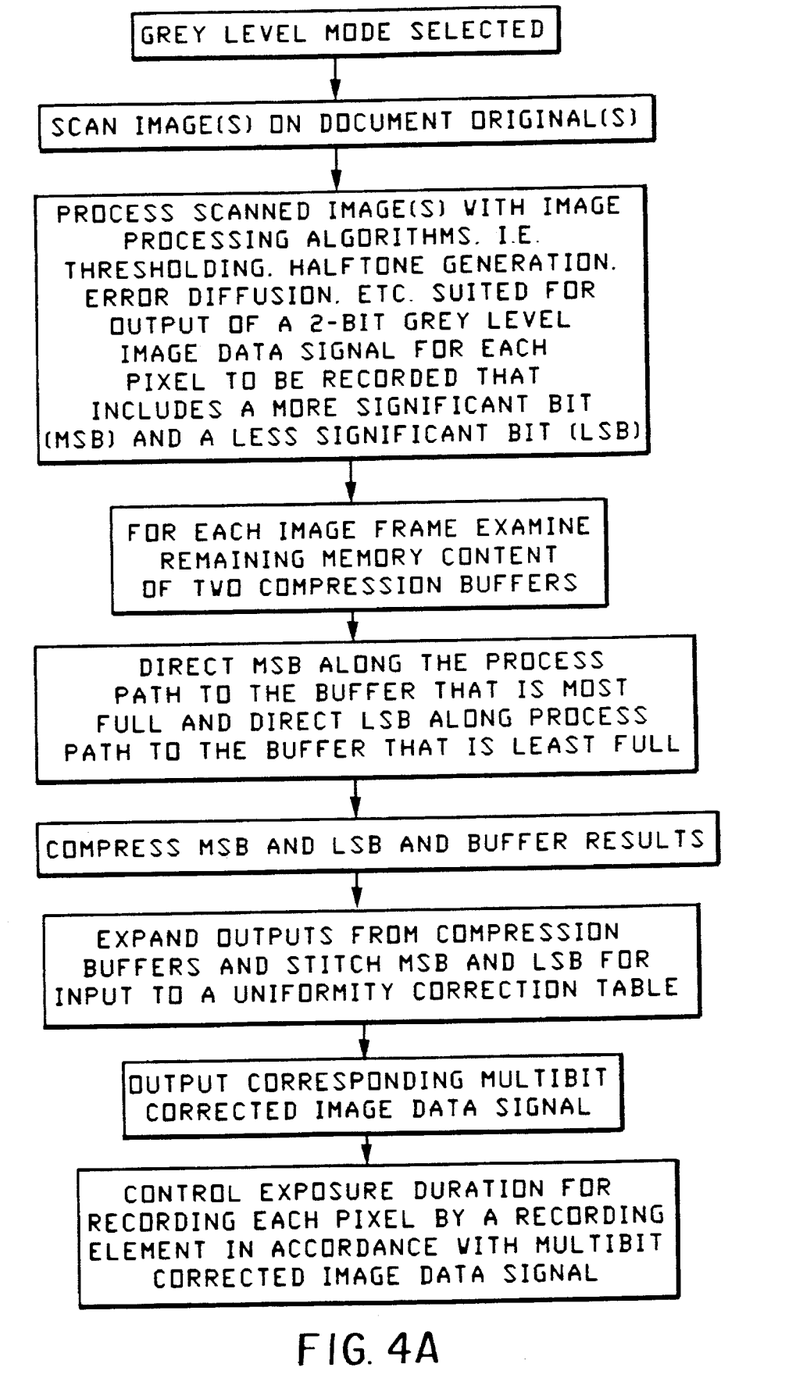
FIGS. 4A and 4B are flowcharts illustrating operation of the system of FIG. 3 in various modes.
Figure 4B:
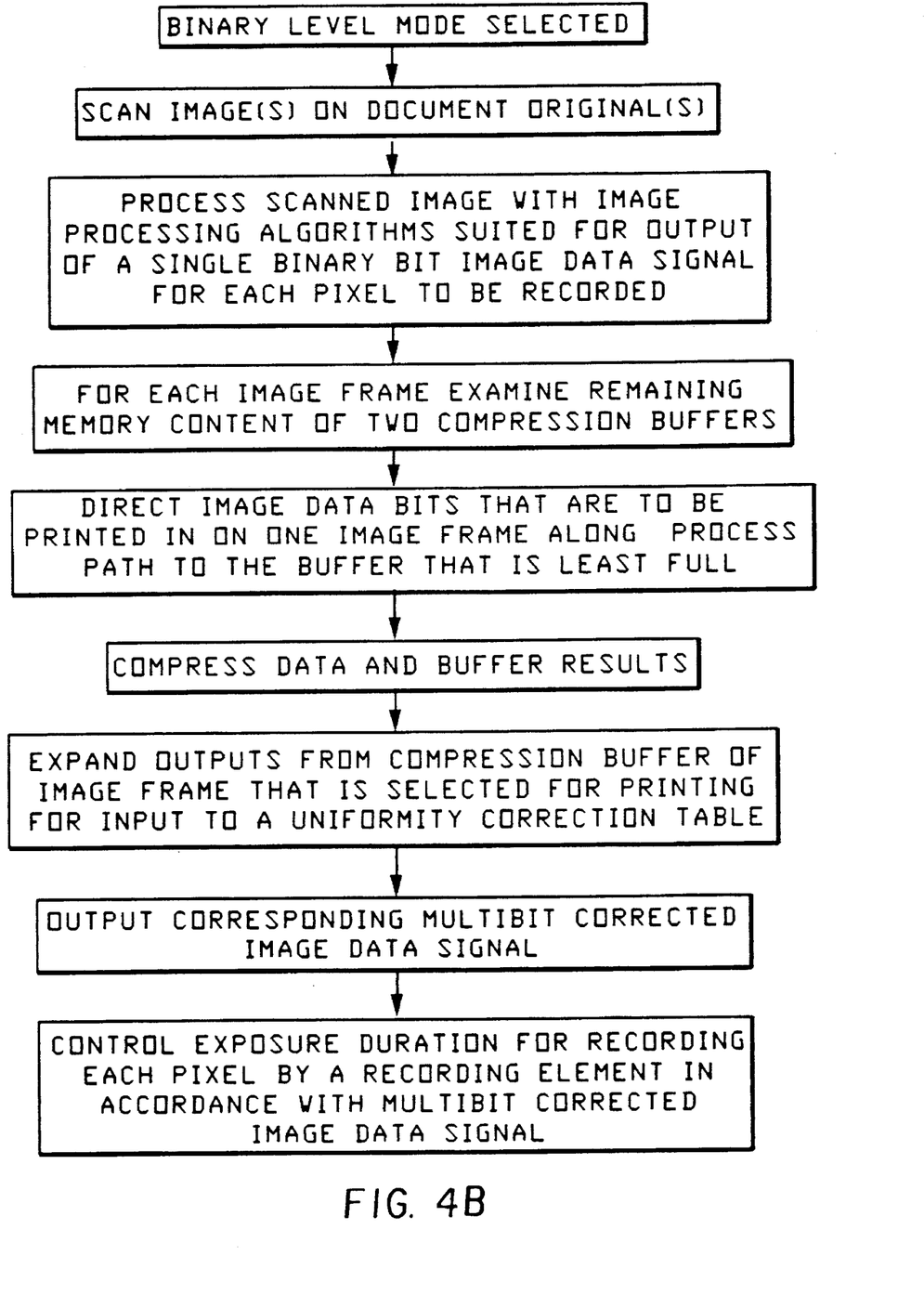

With reference now to FIG. 3c, data from the writer interfaces 126, 126' are stored in buffers 202, 202', respectively. The schematic illustration for buffers 202, 2021 indicate the storage order for the pixel data for the particular LED. A fill address counter 204 counts clock pulses from the appropriate writer interface 126, 126'. A logic and control device 205 may also be provided and be controlled by microcontroller 136. The clock pulses are counted by counter 204 and the output thereof represents an address (from 0–n) for successively accessing a 4-bit nibble storage area in each of buffers 202, 202'. Each address of buffer 202 stores the lower order bits whereas buffer 202' stores the higher order bits of the 2-bit signal that represents a grey level signal for recording four pixels by four LEDs. As may be seen in the buffer 202, a 4-bit nibble is stored in the buffer as received from the writer interface 126 which is resequencing the data for a binary architectured printhead. In such a printhead, the data stream thereto is divided into odd and even pixel data and high and low numbered pixel data. The former is done to accommodate and fill the odd and even driver chips 40 simultaneously. The latter is done to further speed the data flow to the prior art binary architectured printhead by sending data simultaneously to front and back halves to the printhead. As known in the art, a binary architectured printhead employs only a single digital data bit to determine exposure or non-exposure thereof for recording a pixel. Duration of exposure is controlled by non-image data signals such as strobe line(s) etc. In a grey level printhead such as described with reference to FIG. 2 and the patent documents incorporated by reference, a grey level printhead uses a plurality of data bits to control either exposure duration or intensity. The further resequencing device 130 of the invention serves to resequence the single bit data originally sequenced for a binary architectured printhead.

As each 4-bit nibble is output from writer interfaces 126, 126', these outputs are stored in buffers 202, 202' in a sequence starting with address 0 up to n; in this case n will equal 1249 where there are 5000 LEDs. The buffers 202, 202' are shown for purposes of facilitating discussion as being addressed by counter 204 via respective multiplexers 208, 208'. This is done to permit synchronous addressing of the two buffers 202, 202' so that buffers 202, 202' can be filled simultaneously from respective JIBS 101, 101'. However, it is preferred to provide an additional pair of buffers similar to those of 202, 202' and this additional pair can be addressed by a separate fill address counter to permit asynchronous loading of data into buffers from JIB 101, 101'. Thus, while buffer 202 and its complementary pair are being loaded asynchronously, buffer 202' and its complementary pair could be unloaded synchronously via common addressing by empty address counter 206. The multiplexer also provides for selection of whether the fill address counter address output by counter 204 or the empty address counter address 206 is to be output to the respective buffer. After the buffers 202, 202' are filled with their respective data nibbles, a signal from the control logic 205 changes the output of the multiplexer to provide output of the n-to-0 empty address counter 206. Multiplexer 210 also under control of a control signal from control logic 205 receives at its inputs the two 4-bit wide nibbles of data that are read at the address location addressed by empty counter 206. Initially, the first nibble read from address "n" will include data bits for LEDs 2, 1, 2502, 2501. The output of the multiplexer 210 however will be switched so as only to accept the data bits from buffers 202, 202' for LEDs #1 and #2, both low and high order bits for each LED. Thus, the data bits for LEDs #2502 and 2501 are not output by multiplexer 210 at this time. As LED #1 is an odd-numbered recording element, the now-combined 2-bit grey level signal for LED #1 is input to an odd correction table memory 212. In this memory there is stored correction data for each of the odd-numbered LEDs. Thus, for LED #1 for each of the possible four grey levels (counting white) that the 2-bit signal will represent there is stored a corresponding 6-bit signal that represents an exposure duration for that LED for recording that grey level. This 6-bit signal includes correction for nonuniformities between the LEDs as described in accordance with the teachings of PCT International Application WO 91/10311, the contents of which are also incorporated herein by this reference. The corrected 6-bit signal is then output to the printhead 20 with a token bit signal as described above for latching by a register on a driver chip 40 associated with LED #1. Simultaneously, the 2-bit data signal for LED #2 is output to the even correction table memory 212' which is similar to that of table memory 212 but stores corrected data for the even-numbered LEDs. A pixel counter 220 under control of control logic 205 counts clock pulses which indicate an LED or pixel count starting with the number 1 and ending with 2500. As there are 2500 each of the odd and even-numbered LEDs, this count simultaneously represents both and can be used as an address in table memories 212, 212' to identify the data stored in these memories for that particular LED that is to have its input 2-bit grey level signal corrected to a 6-bit signal.

In order to reduce the size of each correction table memory, it may be desirable to consider that some LEDs may be similar to others in respect to performance and that the pixel counter 220 may be used as shown in FIG. 3C to access a code in table memories 216, 216' representing those having a similar performance characteristic. This code could then be output to a smaller correction table memories 212, 212' which also receives at its input the 2-bit grey signal.

The corrected 6-bit data signal for LED #2 is sent on the even data bus 33' simultaneously with sending of the 6-bit data signal for LED #1 on the odd data bus 33. The empty counter is then decremented to address n–1 to access the 2-bit data signal for each of LEDs 3 and 4 in buffers 202, 202' and so on. After the empty address counter reaches 0 to access the data for LEDs 2499 and 2500, the empty address counter 206 is reset back to address n and the multiplexer 210 switched to output the data for the high-numbered LEDs. Thus, at address n, data for LEDs 2501, 2502 will be output from table memories 202, 202' to the correction table memories. The pixel counter 220 will now count 1251 and as the empty address counter again decrements from n to 0, the pixel counter 220 continues to increment from 1251 to 2500. Thus, a line of 5000×6-bit data signals are sent on the respective data busses for latching by the registers in the driver chips for printing a line of grey level pixels.

The above discussion is directed to operation of the printer and printer control system in a two-bits per pixel grey level mode wherein a source of raw image data is obtained by scanning an image on an original document using a CCD or other device or obtaining such information from a computer file. The raw data is processed as is typical by subjecting same to various image processing algorithms, i.e., thresholding, halftone generation, error diffusion suited for output on a rasterized image data signal to a grey level printhead. Thus, a multibit digital data signal from a document scanner can be subjected to thresholding by comparing same to say three fixed threshold values to determine a two-bit grey level signal for such data signal. The two-bit signal comprises a more significant bit (MSB) and a less significant bit (LSB). As noted above, the two-bits are separated and processed by essentially similar separate processing paths or circuits wherein each bit that is associated with the same document is subjected to compression, storage, expansion and then stitched with the corresponding other bit of that pixel for input to an LUT to determine the corresponding corrected grey level data signal for recording that pixel by the particular LED that is to be used to record same. As used herein, pixels associated with a document refer, not necessarily to all pixels on a document original or a printed copy thereof, but to all pixels that are to be printed on a single image frame of the printer apparatus. Thus, where a printed document is to be produced and wherein the sheet includes different colors, the printer apparatus could record portions of the image on different image frames and develop such image frames, respectively, with differently colored toners and transfer the two or more developed images in register to a receiver sheet to form a composite plural color image.

In accordance with the invention claimed in cross-referenced application #2, the operator through an input provided on an operator control panel for the copier may select a high capacity mode. In the high capacity mode, the RIP 110 or image processor 110*a* includes circuitry or software for transforming an input multibit signal into a rasterized single bit per pixel or binary pixel. Such circuitry in the image processor 110*a* could include establishing a threshold level for determining a print or no print decision for creating a binary pixel, as well as halftone algorithms and error diffusion. The microcontroller 136 would then direct the RIP 110 or image processor 110*a* to output rasterized binary bits either to JIB 101 or 101'. Again, all the rasterized pixels associated with a particular image frame are forwarded to the same JIB and the microcontroller 136 keeps track of which JIB, 101 or 101', each frame of rasterized pixels is located in. The microcontroller 136 also is responsive to signals from controllers 134, 134' as to the remaining amount of memory space in each buffer 132, 132'. These signals can be the respective addresses to which the last image frames were input into buffer memories 132, 132'. As data for each new image frame is processed by either RIP 110 or image processor 110*a*, the microcontroller 136 in response to signals from controllers 134, 134' relative to remaining buffer memory 132, 132' directs either the RIP 110 or image processor 110*a* to transfer the data to the JIB 101, 101' having the most amount of available memory. The single bits of data associated with this particular image frame are then subjected to compression, storage and expansion as discussed above. The expansion will be made upon a signal from microcontroller 136 that the particular frame is to be output from the buffer memory 132, 132' to prepare same for printing. After expansion in the appropriate expander 120, 120', the data is processed by the writer interface 126, 126' and output to the resequencer 130. The rasterized single-bit data is stored in one of the buffers 202, 202'. The data is then output from the buffer 202 or 202' in accordance with the resequencing process discussed above except that there is no need to stitch an LSB with an MSB in this single bit image data mode. There is a need in this example, however, to output the data to the correction tables 212, 212' to generate a multibit digital data signal that corrects for nonuniformity in LEDs. In this regard, the control logic 205 may provide a signal to the correction table indicating that this is the single bit mode so that different correction factors may be used in the two bits per pixel mode. The corrected image multibit image data signal is now transmitted to the printhead in the correct sequence as described above for the two-bit grey level case for printing by the grey level printer 20.

In the case where the high quality mode is selected, i.e., where the grey level of each pixel to be recorded is defined by two-bits of data, the controllers 134, 134' provide signals to the microcontroller 136 as to the amount of remaining memory in buffers 132, 132'. For each new image frame being processed, the microcontroller, in response to a signal from the controllers 134, 134' representing memory already occupied or remaining in each buffer 132, directs either the RIP 110 or image processor 110*a* to transmit the LSB to the JIB 101, 101' with the most remaining memory. As noted above, the addresses to which the last image frames were placed in buffer memories can be used to indicate remaining memory in each buffer memory. The reason for this is that, as there is separate compression of LSBs and MSBs, the LSBs being more busy do not compress as well as the MSBs and thus require more memory. The reason for this is that the particular algorithm used is less efficient when there are many density transitions. Therefore, the compression of the LSBs takes up more buffer memory. If the compressed LSBs were always directed to the same memory, the LSB memory would fill long before that of the MSB and result in inefficient use of memory space. The invention in cross-referenced application #1 contemplates broadly that, where the processing of one bit of a multibit signal would be more efficiently processed along one processing path, that the control logic or program be optimized to adjust for such efficient processing.

In order to increase productivity, the resequencer may have a duplicate buffer for each of buffers 202, 202' so that as data is being input to one set of buffers 202, 202' from the writer interfaces 126, 126', the other set of buffers may have its data sent to the printer via correction tables 212, 212'.

The teachings of the invention claimed in cross-referenced application #1, regarding selection of a processing path for efficient use of memory are also applicable to processing data for a binary printhead. Thus, the data can be removed from a memory such as memory 127 or 128 as described above and sent directly to a binary printhead without the addition of correction information to the data and without combining or stitching such binary data with data from memory 127' or 128'. The printhead would receive only a single data bit for each pixel and the exposure time determined by a strobe signal as is conventional for binary architectured printheads.

In a further modification, the grey level printhead can be operated in a binary or single bit mode wherein the data bits stored in memory 202 in the order shown in FIG. 3C represent the single image data bits for one line of pixels and those stored in memory 202' are the corresponding ones for the next line of pixels. In such a mode the operation is similar to that described above except that in the single bit mode, the multiplexer 210 is programmed not to pass data from memory 202' when the empty address counter 206 is addressing memory 126 and vice versa. In addition, the correction table memories 212, 212' may be programmed in such a mode to provide correction data suited for recording an average density pixel for that LED.

Generally, in accordance with the above teaching, it can be shown where N recording elements are considered as being grouped in M groups, that the memories 202, 202' can each be emptied M times so that in a first round data for recording elements 1 through N/M are emptied, then in a second round data for (N/M)+1 through 2N/M, then data for (2N/M)+1 through 3N/M and so on until emptying of data for the final group [(M−1)N/M]+1 through N. In such grouping, odd and even data can be considered in the same group and are simultaneously extracted in pairs.

The preferred embodiment has been described with regard to operating on two bits per pixel data signals by directing these bits to separate processing paths. It is contemplated that signals with more than 2 bits may be processed along different processing paths. Thus, where data signals of four bits per pixel are being processed the data can be processed by four processing paths of the type described herein with the buffer memory having the most available memory handling the bit which compresses least efficiently and the memory having the next most available memory handling the bit which is next most efficient in compression, and so on.

As an alternative, the multibit per pixel image data from the RIP 110 and/or image processor 110a may be in Gray code instead of binary coded. In the case of 2 bits per pixel image data, the LSBs in Gray code compress somewhat more efficiently with the noted compression algorithm but there are still advantages for processing the LSBs along the path having the most available buffer memory. However, in a 4 bits per pixel grey level system and/or with use of other compression algorithms, each of the Gray coded data bits may be separately processed with reasonable efficiency along fixed or dedicated processing paths of the type described herein without need for switching or ping-pong processing of the LSBs to the path containing the most available memory. With such Gray coding of data, the buffer memories may be found to fill generally uniformly because of the nature of the code.

In still a further modification and where a compression-expansion algorithm is operable on say 2 bits, a 4 bits per pixel data systems may be processed by breaking up the 4 bits into segments of two bits (higher and lower) and processing the data along two parallel processing paths.

In a further embodiment, alternate switching of processing paths may be done so that for one image frame or even a portion thereof whose size is dependent upon compression efficiency, the LSBs and MSBs are processed along first and second respective paths and for a second image frame or portion thereof of pixels, the processing is reversed with LSBs and MSBs processed along second and first paths, respectively.

ADVANTAGES

The invention thus provides for operation of a copier/printer having processing circuitry suited for processing data initially sequenced for a binary printhead and reformatting same for a grey level printhead.

The invention has been described in detail with particular reference to preferred embodiments thereof, but it will be understood that variations and modifications can be effected within the spirit and scope of the invention.

We claim:

1. An apparatus for resequencing image data for a non-impact printhead, the non-impact printhead having plural recording elements, the recording elements being arranged on said printhead in a sequential order with certain recording elements of the plural recording elements being located in a first group on a first half of the printhead and other recording elements of the plural recording elements being located in a second group on a second half of the printhead, the apparatus comprising:

first memory means for storing at each of plural predetermined address locations in the first memory means, a data set including plural bits of image data corresponding to respective recording elements in both said first group and said second group;

means for processing image data;

multiplexer means connected to said first memory means and to said means for processing image data, said multiplexer means selectively controlling movement of image data from said first memory means to said means for processing image data;

addressing means for sequentially addressing addresses to said first memory means in a predetermined order during a first addressing mode, said first memory means being responsive to said addresses for outputting to said multiplexer means from said first memory means a first series of image data bits corresponding to said recording elements in said first group and to recording elements in said second group, said multiplexer means outputting to said means for processing image data image data bits of said first series and corresponding to said recording elements in said first group without outputting, during said first addressing mode, to said means for processing image data, image data bits of said first series and corresponding to said recording elements in said second group, said addressing means being operative to repeat a sequential addressing of said addresses to said first memory means in a second addressing mode and said first memory means being operative in said second addressing mode to output to said multiplexer means a second series of image data bits corresponding to said recording elements in said first group and to said recording elements in said second group, said multiplexer means outputting to said means for processing image data image data bits of said second series and corresponding to said recording elements in the second group without simultaneously outputting to said means for processing image data image data bits from said second series corresponding to recording elements in said first group.

2. An apparatus for resequencing image data for a non-impact printhead, the non-impact printhead having plural recording elements, the recording elements being arranged on said printhead in a sequential order with certain of said recording elements being considered in a first group on a first half of the printhead and others of said recording elements being considered in a second group on a second half of the printhead, the apparatus comprising:

first means, including a first memory, for storing at a predetermined address location in the memory plural bits of image data corresponding to respective recording elements in said first group and to respective recording elements in said second group;

second means for generating memory addresses in a first counting mode and in a second counting mode, said second means sequentially addressing addresses to said first memory in a predetermined order during said first counting mode, said first means being responsive to said address of said address location for outputting from said address location of said first memory a first series of image data bits corresponding to said recording elements in the first group and to said recording elements in the second group;

a correction table memory;

third means for inputting a portion of said first series of image data bits corresponding to said recording elements in the first group to the correction table memory without inputting, during said first counting mode, to said correction table memory image data bits of said first series corresponding to said recording elements in the second group;

means for outputting from said correction table memory a series of signals representing corrected data signals for controlling a printing parameter;

said second means being operative to repeat a sequential addressing of said addresses to said first memory during a second counting mode, and said first means being responsive to said sequential addressing during said second counting mode for outputting from said address location of said first memory a second series of image data bits corresponding to said recording elements in the first group and to said recording elements in the second group, said third means being operative to input to the correction table memory a portion of said second series of image data bits corresponding to recording elements in said second group without inputting, during said second counting mode, to said correction table memory image data bits corresponding to recording elements in said first group.

3. A method for resequencing image data for a non-impact printhead, the non-impact printhead having plural recording elements, the recording elements being arranged on said printhead in a sequential order with certain of said recording elements being considered in a first group and others of said recording elements being considered in a second group, the method comprising the steps of:

storing at a predetermined address location in a first memory plural bits of image data corresponding to a respective recording element of said printhead in said first group and a respective recording element of said printhead in said second group;

generating memory addresses in a first counting mode;

sequentially addressing addresses to said first memory in a predetermined order during said first counting mode and outputting from said first memory in response to addressing said address location a first set of image data bits stored in said address location and corresponding to said recording element in said first group and the recording element in the second group;

inputting a portion of first set of data bits corresponding to said recording element in the first group to a correction table memory without inputting, during said first counting mode, to said correction table memory data bits of said first set and corresponding to said recording element in second group;

outputting from said correction table memory in response to input of data bits to said correction table memory a series of signals representing corrected data signals for controlling a printing parameter;

generating said memory addresses in a second counting mode and repeating a sequential addressing of said addresses to said first memory and outputting from said address location of said first memory a second set of image data bits corresponding at least to a recording element in the second group and inputting a portion of said second set of data bits corresponding to said recording element in the second group to a correction table memory without inputting, during said second counting mode, to said correction table memory data bits of said second set and corresponding to said recording element in said first group.

4. The method of claim 3 including the steps of generating multibit image data signals, each of said multibit image data signals including a least significant bit and a more significant bit representing a grey level for each pixel to be recorded by the printhead; storing in said first memory only respective least significant bits of the multibit image data signals; and storing more significant bits of the multibit image data signals in a second memory.

5. The method of claim 4 wherein in response to one of said signals representing a least significant bit and a more significant bit, both associated with a respective recording element of the plural recording elements, said correction table generates a corrected multibit signal, greater than two bits, for determining an exposure parameter for controlling recording of a pixel by the respective recording element.

6. The method of claim 5 and including generating a first address count for writing a data set representing least significant bits of at least four pixels into said first memory at a location corresponding to said first address count.

7. The method of claim 6 and including multiplexing data from said first memory and said second memory to select data for input to the correction table memory that includes corresponding correction data.

8. The method of claim 7 and including transmitting the corrected data signal to said printhead.

9. The method of claim 3 and wherein data bits of said first set are identical to data bits of said second set.

* * * * *